Sept. 1, 1964   E. LUDLOW ETAL   3,146,850
SOUND ATTENUATING GAS CONDUIT
Filed Sept. 18, 1961   3 Sheets-Sheet 1
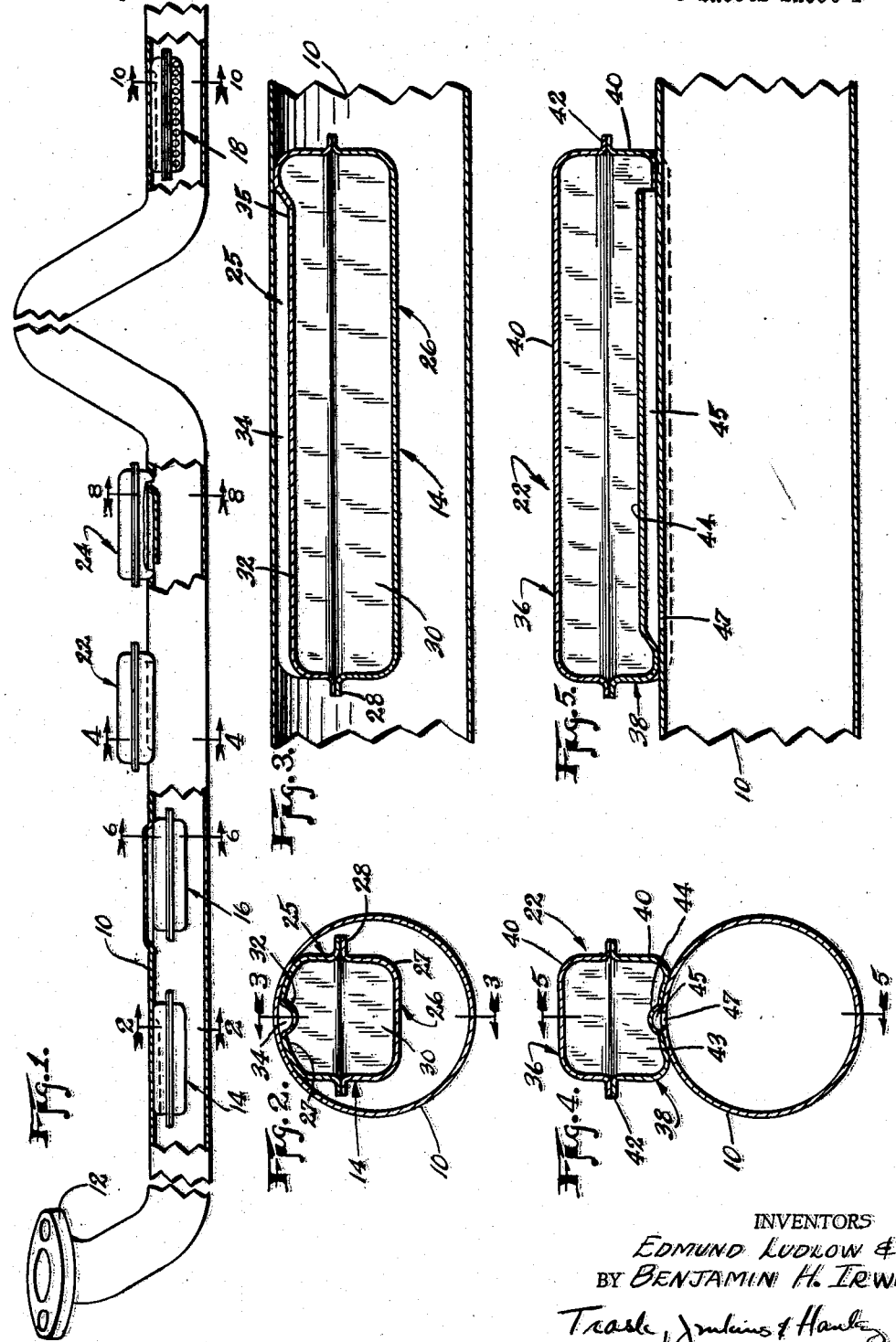
INVENTORS
EDMUND LUDLOW &
BY BENJAMIN H. IRWIN
Trask, Jenkins & Hawley
ATTORNEYS.

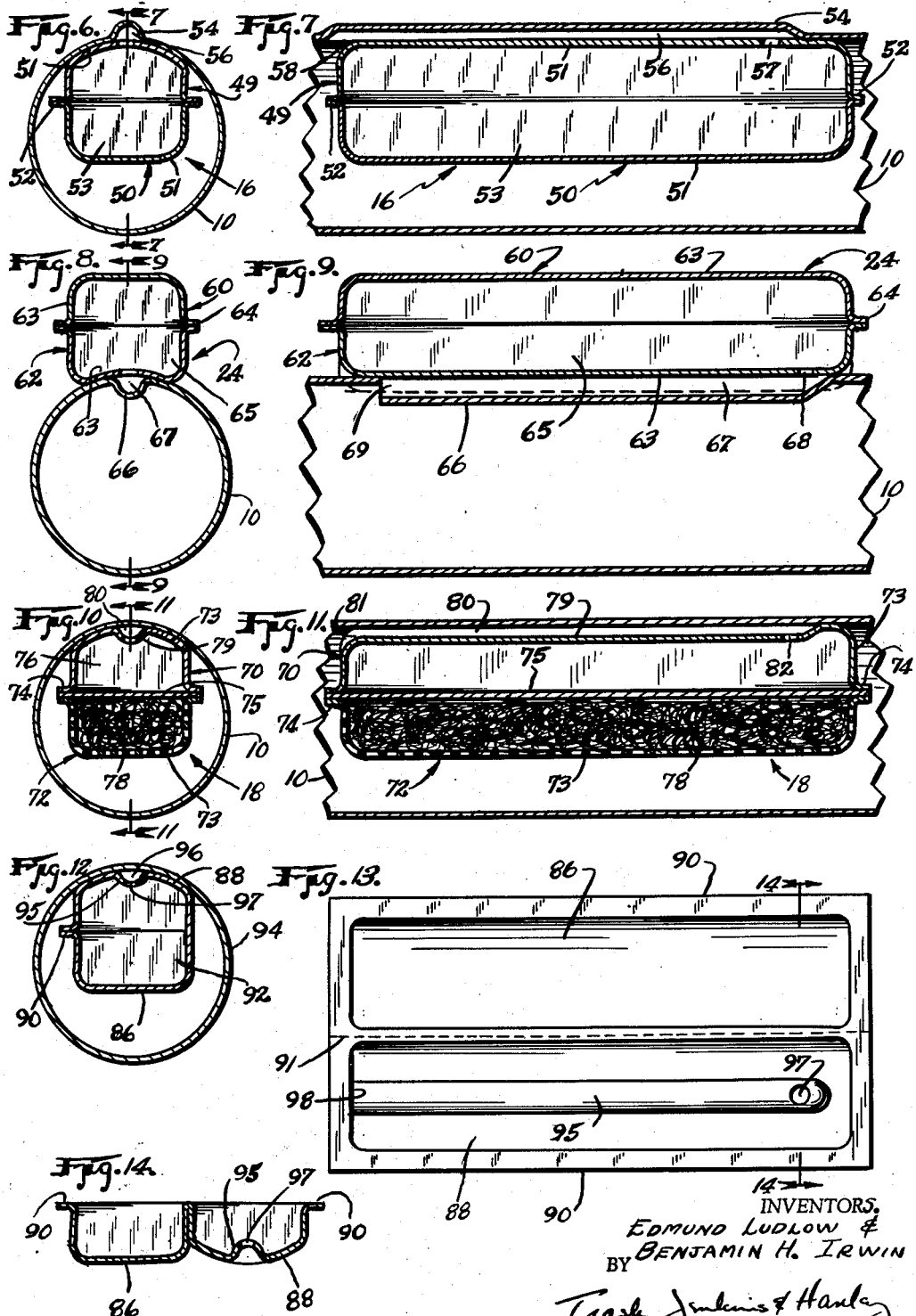

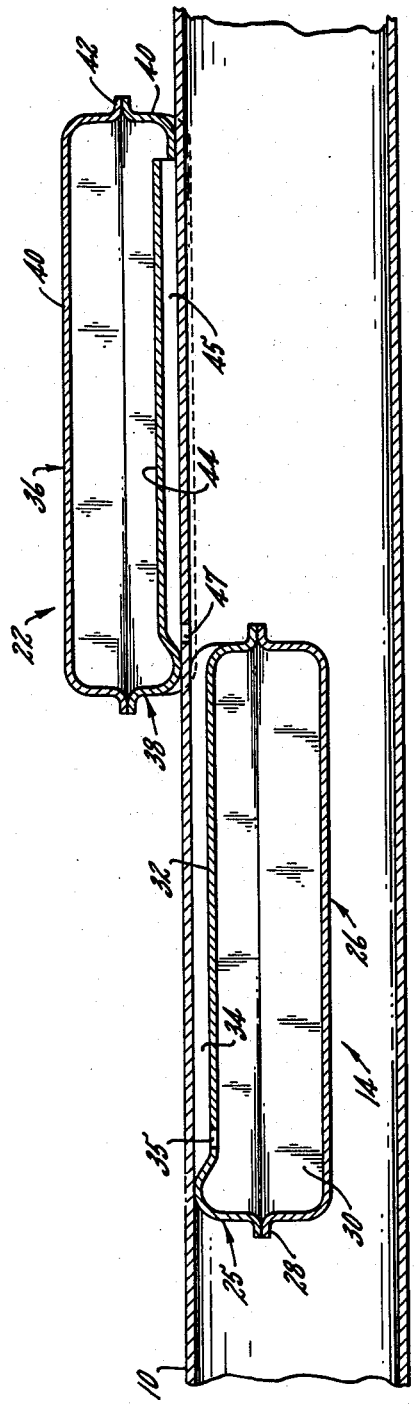

United States Patent Office 3,146,850
Patented Sept. 1, 1964

3,146,850
SOUND ATTENUATING GAS CONDUIT
Edmund Ludlow and Benjamin H. Irwin, Columbus, Ind., assignors to Arvin Industries, Inc., Columbus, Ind., a corporation of Indiana
Filed Sept. 18, 1961, Ser. No. 138,728
15 Claims. (Cl. 181—59)

This invention relates to a sound attenuating gas conduit for conveying, and attenuating the noise level of, a moving gas stream, and which is well adapted for use with an internal combustion engine for conveying the exhaust gases therefrom and silencing the noise level of said exhaust gases.

It is an object of our invention to provide such a sound attenuating gas conduit which will meet limited space requirements, which can be easily manufactured largely from inexpensive metal-tubing and sheet-metal stampings, and which can be of light weight construction with its weight substantially uniformly distributed along its length. It is a further object of our invention to provide a sound attenuating gas conduit which can have a plurality of bends along its length, and which will create minimal back pressures. It is a further object of our invention to provide such a sound attenuating gas conduit which can be made to effect sound attenuation over a wide range of frequencies, which can be made to remain substantially in tune with said frequencies irrespective of temperature changes of the gas stream in which the sound waves are carried. It is still a further object of our invention to provide such a sound attenuating gas conduit which will be less susceptible to certain types of corrosion than conventional gas-silencing systems, and which may employ replaceable sound attenuating units.

It is a special object of our invention to provide a sound attenuating gas conduit for the exhaust gas stream of an automotive vehicle, which will eliminate the need for the bulky, expensive, and troublesome mufflers which are required in conventional automotive exhaust-silencing systems.

In such applications as automotive exhaust silencing, our invention contemplates a system embodying a conduit having a number of silencing elements in interrelated arrangement used in the absence of other silencing means. However, if desired, our conduit employing one or more silencing elements may be used in combination with other silencing means.

In accordance with our invention as applied to an automotive exhaust system, the exhaust manifold is connected to a pipe to convey the exhaust gases to the desired discharge point, as at the rear of the vehicle. Acoustically, such pipe, usually with at least part of the exhaust manifold, forms a conduit in which the exhaust sound produces standing wave pressure patterns, wherein each of the several harmonic components of the standing wave has one or more distinct pressure points, that is, points of maximum sound pressure which are located at particular locations along the conduit. In accordance with the preferred form of our invention, sound attenuating elements are placed in operative association with the exhaust gases at or adjacent to these pressure points, and are respectively made to attenuate the particular harmonic frequencies or bands of frequencies having pressure points at or adjacent such locations.

The silencing elements are provided with resonator volumes and are secured directly to the pipe. The elements are provided with wall areas within the extent of their portions connected to the pipe that form with said pipe resonator throats acoustically coupling said resonator volumes with the gas stream. The silencing elements may be mounted externally or internally of the pipe, and in many systems it will be desirable to use a combination of elements mounted both externally and internally of the pipe. Where such silencing elements are mounted internally of the pipe, their presence in the gas stream produces a series of impedence changes creating turbulent areas in the gas stream which effect a degree of sound wave cancellation to thus reduce the amount of attenuation that must be produced by the resonator throats and cavities. Further, the throats of the internally mounted elements are in direct thermal coupling relationship with the gas stream so that changes in the temperature of the gas stream will cause corresponding temperature changes in the silencing elements. Thus, when the frequencies of the gas sound waves in the gas stream change due to changes in the temperature of said gas stream, the frequency responses of the silencing elements will undergo a corresponding change so that said silencing elements remain relatively in tune with the frequencies of the sound waves of the gas stream.

Conversely, the elements may be mounted externally of the pipe which, of course, facilitates their mounting on the pipe and permits them to be easily mounted on both the curved and straight pipe sections. In addition, such external mounting of the silencing elements precludes the possibility of their creating a back pressure within the pipe.

Other objects and features of our invention will become apparent from the more detailed description which follows and from the accompanying drawings, in which:

FIG. 1 is a fragmentary isometric view with portions thereof broken away and showing a sound attenuating exhaust system embodying our invention;

FIG. 2 is an enlarged transverse vertical section taken on the line 2—2 of FIG. 1 and showing one embodiment of our silencing element;

FIG. 3 is a longitudinal vertical section taken on the line 3—3 of FIG. 2;

FIG. 4 is an enlarged transverse vertical section taken on the line 4—4 of FIG. 1 and showing a modified form of the silencing element of FIG. 2;

FIG. 5 is an enlarged longitudinal vertical section taken on the line 5—5 of FIG. 4;

FIG. 6 is an enlarged transverse vertical section taken on the line 6—6 of FIG. 1 and showing another embodiment of our silencing element;

FIG. 7 is a transverse vertical section taken on the line 7—7 of FIG. 6;

FIG. 8 is an enlarged transverse vertical section taken on the line 8—8 of FIG. 1 and showing a modified form of the silencing element of FIG. 6;

FIG. 9 is a longitudinal vertical section taken on the line 9—9 of FIG. 8;

FIG. 10 is an enlarged transverse vertical section taken on the line 10—10 of FIG. 1 and showing a modified form of the silencing element of FIG. 2;

FIG. 11 is a longitudinal vertical section taken on the line 11—11 of FIG. 10;

FIG. 12 is a transverse section of a conduit having another embodiment of our silencing element mounted therein;

FIG. 13 is a plan view of a stamping forming the silencing element of FIG. 12;

FIG. 14 is a vertical section taken on the line 14—14 of FIG. 13, and

FIG. 15 is a longitudinal section of a conduit having the resonators of FIGS. 2 and 4 mounted thereon.

Our invention is particularly well adapted for use with an internal combustion engine in an automobile to attenuate the noises resulting from the operation of said engine and to convey the engine exhaust gases to a suitable discharge point. In such usage, it completely replaces a conventional exhaust system in which all of the silencing effect is lumped in a specific location determined by the structural requirements of the vehicle, as a muffler connected between an exhaust pipe joined to the exhaust manifold of the engine and a tail pipe leading from the muffler to a gas discharge point.

Our invention avoids the need for such large mufflers at specific locations on the underside of an automotive vehicle by the employment of an exhaust gas conduit extending from the engine manifold to a gas discharge point and having a plurality of small silencing elements mounted on it. The silencing elements may be designed to attenuate different and/or overlapping bands of sound wave frequencies and may be located on said pipe with respect to the harmonic characteristics of the pipe so that they will effect sound attenuation without the use of large bulky resonator chambers, as are required in conventional muffler-type systems.

Our silencing elements comprise a plurality of sheet-metal stampings which are contoured to provide opposed first wall areas disposed in spaced relation and sealed around their borders to define resonator volumes. Each of the silencing elements has a portion of its first wall areas rigidly secured to the wall of a gas-carrying pipe, and each is contoured within said first wall area portion to define with the adjacent pipe wall a resonator throat operatively interconnecting the resonator volume with the gas stream flowing through the pipe. Because the resonators are formed from relatively small sheet-metal stampings, the overall weight of our silencing system will be minimized, as will the cost of such system. Further, because of their relatively small size, the silencing elements can be mounted internally or externally on the pipe in any desired circumferential position, thus obviating the necessity of mounting them on the bottom side of the pipe in a position in which they would tend to trap condensed corrosive materials. When the silencing elements are mounted externally on the pipe, they will not create any back pressures within said pipe, thus permitting a smaller diameter pipe to be employed to reduce both the weight and the cost of the system. However, such externally mounted elements, not being physically located in the gas stream, will not be thermally coupled to the gas stream to the same degree as the internally mounted elements, and thus will not remain in tune with the sound wave frequencies which they are tuned to attenuate to the same degree as if they were mounted internally of the pipe. When the elements are mounted internally of the pipe, they are in direct thermal coupling relationship with the exhaust gases passing through said pipe, and thus will remain substantially in tune with the sound wave frequencies which they are tuned to attenuate irrespective of the temperature of the gas stream.

In the operation of a conventional internal combustion engine in an automobile, the combustion of fuel within the cylinders produces a substantial volume of hot exhaust gases which are exhausted with substantial noise into the exhaust manifolds mounted on the engine in communication with the cylinder exhaust ports. The frequencies of the sound waves in such exhaust gases extend over a wide range, such as from about 30 cycles per second to about 5,000 cycles per second, with the lower frequencies largely representing the fundamental and lower harmonics determined by the length of the exhaust conduit. In many exhaust systems it is the lower range of frequencies, i.e., frequencies below 200 cycles per second, that are the most difficult to attenuate and produce the most objectionable noises, especially since it is in this low frequency range that the firing frequencies of the engine coincide with and augment the natural resonant frequencies of the exhaust system itself.

The lower frequencies are particularly difficult to silence when the engine is propelling the vehicle at a rate of speed of from about 20 miles per hour to about 50 miles per hour. At these speeds most engines fire at frequencies below 200 cycles per second, the range in which the fundamental and first overtone of substantially all silencing systems fall. Generally, if the engine is propelling the automobile at a speed slower than about 20 miles per hour, its firing frequencies will be well below the fundamental frequency of the silencing system and thus will not coincide with nor augment the natural resonant frequency of the exhaust system itself to any appreciable extent. And if the engine is propelling the automobile faster than about 50 miles per hour, its firing frequencies will generally be higher than the first overtone of the exhaust system. Also, the natural road noises at these higher speeds are more predominant than the exhaust gas noises.

In many conventional mufflers these lower frequencies are quite difficult to attenuate because the large size of the mufflers prevents them from being positioned in the exhaust system on the under-side of the vehicle to act upon and attenuate these low frequencies.

Our invention is adapted to attenuate the exhaust noises incident to the operation of an internal combustion engine over a wide range of sound wave frequencies, including the troublesome frequencies below 200 cycles per second, by passing the exhaust gases of said engine through an exhaust conduit having a plurality of silencing elements mounted along its length. The silencing elements may be tuned to attenuate different and overlapping bands of frequencies. While silencing elements in accordance with our invention may be used alone to effect attenuation of the exhaust gas noises, they may be used in combination with conventional mufflers, or may be incorporated within otherwise conventional mufflers as acoustical muffler components, or used in combination with acoustical liners employed in the manifold or in the exhaust conduit itself.

FIG. 1 illustrates an exhaust gas conduit embodying our invention and having a plurality of both internally and externally disposed silencing elements. Said conduit comprises a pipe 10 adapted to be connected at one end to an exhaust manifold of an internal combustion engine by a conventional mounting flange 12 with its opposite end open to the atmosphere. Conveniently, the pipe 10 may have a diameter in the same range as the diameters of the exhaust and tail pipes used in conventional exhaust systems. For example, it may have a diameter of about one and three-quarters to two and one-half inches, the diameters normally used in conventional exhaust pipes and tail pipes on automobiles; but it may have a larger diameter, say as large as four inches, the diameter of conventional exhaust and tail pipes in trucks, buses, and other large vehicles. The pipe 10 may be of a unitary length, as illustrated, or it may be in the form of a plurality of short interconnected lengths of pipe to facilitate assembly and/or replacement. As shown, mounted on the pipe 10 are a plurality of internal silencing elements 14, 16, and 18 and a plurality of external silencing elements 22 and 24.

The silencing element 14 is illustrated in FIGS. 2 and 3, and comprises a pair of opposed sheet-metal stampings 25 and 26. Each of said stampings has a first wall area deformed to form a concavity 27 disposed inwardly from the margins of said stamping and surrounded by a peripherally extending second wall area or flange 28. The flanges 28 on the two stampings 25 and 26 are rigidly secured together to seal the border of the opposed concavities 27, whereby the opposed concavities form a resonator volume 30. As shown in FIG. 2, the concavity 27 formed in the stamping 25 abuts the inner face of the pipe 10 in a face-to-face relationship and is rigidly secured thereto.

Formed within the portion of the concavity 27 abutting the pipe 10 is an inwardly projecting bead 32 constituting a third wall area which, with the portion of the pipe 10 in alignment therewith, forms a resonator throat 34. Said throat is in open communication with the gas stream as by one end of the bead 32 terminating outside the extent of the concavity 27, and in open communication with the resonator volume 30 by an opening 35 formed in the bead 32. In this manner, the resonator volume 30 is in open communication with the gas stream moving through the pipe 10 so that the resonator throat 34 and volume 30 will attenuate the noise level of the sound waves in the exhaust gases.

The silencing element 22, illustrated in FIGS. 4 and 5 is mounted on the outside of the pipe 10 and is an inverted version of the silencing element 14 shown in FIG. 2. The silencing element 22 is formed from a pair of opposed sheet-metal stampings 36 and 38. Each of said stampings has a centrally located concavity 40 constituting a first wall area bordered by a peripherally extending flange 42 constituting a second wall area. The flanges 42 on the stampings 36 and 38 are rigidly secured together to form a seal extending around the border of the concavities 40 so that the opposed concavities 40 define a resonator volume 43. A portion of the concavity 40 in the samping 38 is contoured to abut the outer face of the pipe 10 in a face-to-face relationship and is rigidly secured thereto for mounting the element 22 on said pipe. An inwardly projecting bead 44 constituting a third wall area is formed within the portion of the concavity 40 abutting the pipe 10 which, with the portion of the pipe lying thereunder, defines a resonator throat 45. Said throat is in open communication with the resonator volume 43 by an opening 46 formed in said bead and in open communication with the interior of the pipe 10 by an opening 47 formed in said pipe within the extent of the bead 44. In this manner, the resonator throat 45 and volume 43 are operatively interconnected to the gas stream moving through the pipe 10 whereby said throat and volume will attenuate the noise level of the sound waves in the exhaust gases.

In order that the system of silencing elements will attenuate a substantial range of sound wave frequencies in the exhaust gases, it is necessary that the individual resonator throats and volumes of the elements be tuned with respect to the harmonic characteristics of the exhaust conduit and/or the firing frequencies of the engine. The latter, at least in the troublesome range below 200 cycles per second, normally are correlated with the former so that in most instances the resonators are turned to frequencies which constitute multiples of fundamental resonant frequency of the conduit. Such multiples may constitute whole number multiples (for example, 1, 2, 3, etc.) in which case the resonator throats and volumes will be tuned to the various harmonics of the conduit, and such multiples may also constitute mixed number multiples (for example, 1½, 2½, etc.) in which case said throats and volumes will be tuned to fractional components of the conduit harmonics. Desirably, the throats and volumes of the silencing elements are tuned to both the whole number multiples and mixed number multiples of the fundamental resonant frequency of the conduit, and are thus correlated with, and responsive to, both the harmonic conduit frequencies and the firing frequencies of the engine when said engine is propelling a vehicle at speeds in the range of from about 20 m.p.h. to about 50 m.p.h.

Tuning of the resonator throats and volumes may be effected by adjusting the conductivity of the throat with respect to the size or capacity of the volume. The formula for calculating such tuning may be represented by the formula:

$$f = \frac{C}{2\pi}\sqrt{\frac{C_o}{V_c}}$$

where $f$ is the frequency to which the resonator is to be tuned, C is the speed of sound in inches per second at the temperature of the medium, $V_c$ is the capacity of the resonator volume, and $C_o$ is the conductivity of the resonator throat calculated from the formula:

$$C_o = \frac{2\pi r^2}{2h + \pi r}$$

where $r$ is the radius of the throat and $h$ is the length of the throat. Where the throats are non-circular, as in the case of the silencing elements 14 and 22, their conductivity may be calculated by the above formula using their cross-sectional area instead of quantity $\pi r^2$, and the mean radius of their cross-section instead of the quantity $\pi r$. While each resonator attenuates to a maximum degree the particular frequency to which it is tuned, it will, of course, attenuate to a lesser extent a limited band of frequencies on either side of that particular frequency, and will effect some attenuation of substantially all frequencies.

Preferably, the resonators formed by our silencing elements are tuned to attenuate the objectionable harmonics, or fractional components of said harmonics, in the gases in the conduit. Each of these harmonic components will have specifically located maximum sound-pressure points along the length of the conduit, the number of such pressure points and their location being a function of the particular harmonic component involved. For example, the second overtone (third harmonic) will have three maximum pressure points along the conduit which will occur at points spaced from either end of the conduit by distances of one-sixth, one-half, and five-sixths of the conduit-length. Each of the resonators will attenuate to the maximum degree the particular harmonic, or fraction of a harmonic, to which it is tuned, if its throat opening is coupled to the gas stream at one of the points of maximum pressure of the harmonic or harmonic fraction for which it is tuned. While the resonators will effect maximum attenuation when their throats are located precisely at their maximum pressure points, they will, of course, still operate at high attenuation efficiencies if their throats are located adjacent such pressure points. For example, we have found that a resonator will operate at not less than 90% efficiency if its throat opening is placed at any point within a distance from the true maximum pressure point equal to one-twentieth of the length of the sound wave producing the pressure point.

In general, such maximum pressure points are spaced from an end of the conduit by fractions L of the conduit-length according to the formula:

$$L = \frac{2m - 1}{2n}$$

where $n$ is the harmonic number for which the resonator is tuned, and $m$ is every integer between and including 1 and $n$.

The above formula is used for calculating the locations of the various sound pressure points when the conduit and the exhaust gases moving therethrough are at ambient temperatures. However, when the engine connected to the conduit is in operation under normal conditions of use, it will discharge gases into the conduit at elevated temperatures thereby increasing the temperature of the conduit and increasing the velocity of the sound waves carried in said gases to shift the locations of the pressure points as calculated from the above formula. When the engine is operating under normal conditions, the locations of the pressure points shift downstream a distance equal to from about 2% to about 4% of the wave length of the frequencies producing the various pressure points. The temperature gradient along the conduit from the exhaust manifold on the engine to the discharge end of said conduit is not uniform, and the locations of the pressure points toward the upstream end of the conduit will be shifted downstream to a greater degree than the locations of the pressure points toward the discharge end of the conduit. Thus, the resonators are tuned to attenuate the desired sound wave frequencies in the gases in the conduit and the above formula is employed to determine the positions that the resonator throats should open into the conduit. However, for the resonators to achieve maximum effectiveness, the resonators are mounted on the conduit with their throats opening into the conduit at points spaced downstream from the locations calculated by said formula by distances equal to about 2% to about 4% of the wave length of the frequencies to which the resonators are tuned.

In most systems for use in attenuating the exhaust noises of an internal combustion engine it is preferable to employ a plurality of resonators with the bulk of the attenuating capacity of said resonators tuned to attenuate frequencies within a range lying between and including the fundamental and third overtone of the conduit. With the bulk of the attenuation occurring in the range, the two most generally troublesome pipe harmonics will be attenuated, as will be most predominant and troublesome firing frequencies of the engine, which firing frequencies occur when the engine is propelling the vehicle at speeds in the range of from about 20 m.p.h. to about 50 m.p.h. The remainder of the resonators may be tuned to attenuate the higher frequencies so that the system of resonators effects an attenuation of the entire range of frequencies of the sound waves created by the operation of the engine.

Because of their internal mounting, the silencing elements 14, 16, and 22 are normally mounted only in the straight sections of the pipe 10, but the maximum pressure point of a particular frequency may be in a curved section of the pipe. In such a situation, it may be more convenient to employ an externally mounted silencing element 22 or 24, since the elements 22 and 24, because of their external mounting, lend themselves better to being mounted on curved pipe sections than do the internally mounted elements 14, 16 and 22.

Both the externally and internally mounted silencing elements have their own respective advantages and limitations, and generally speaking, one is not to be considered as preferred over the other. For example, the throats of the internally mounted elements are in intimate acoustic and thermal coupling with the gas stream which causes the internally mounted elements to effect a greater degree of attenuation per unit of resonator volume capacity than the externally mounted elements. And as will be more fully explained hereinafter, their more intimate thermal coupling with the gas stream also causes their frequency response (tuning) to shift with frequency changes of sound waves to a greater degree than certain of the externally mounted elements which are somewhat thermally isolated from the gas stream and are subjected to air wash during vehicle movement. The externally mounted elements, on the other hand, may be mounted more easily on the curved sections of the conduit than the internally mounted elements, and it frequently occurs that a maximum sound pressure point will lie in such a curved conduit portion. Being disposed outside the gas stream, the externally mounted elements do not create any back pressure whatsoever within the conduit, and frequently permit the use of a smaller diameter conduit than may be employed with either the internally mounted elements or conventional exhaust systems using mufflers. Thus, while a system employing wholly externally or wholly internally mounted silencing elements will effect the necessary exhaust gas noise attenuation, it is frequently desirable to employ a system using both internally and externally mounted elements.

An additional advantage in the use of a combination of internally and externally mounted elements is seen in that it may occur that a single resonator will not sufficiently attenuate a particular frequency. In which case, it may be desirable, for example, to mount a pair of silencing elements 14 and 22 in axial positions along the length of the pipe 10 so that both of their throats open into said pipe adjacent the pressure point of the frequency to which the two silencing elements are tuned, as is shown in FIG. 15. As will be apparent, such a dual mounting of the silencing elements 14 and 22 will permit two silencing elements to be mounted on the pipe 10 at each pressure point. Although the two elements in such a dual mounting are to attenuate the same frequency, their throat and volume sizes may be sufficiently different such that they are tuned to two different frequencies. The external element 22, which may not be as responsive to the temperature changes of the gas stream will be of a size and configuration such that it is tuned to a higher frequency than the element 14 whose frequency response (tuning) will change directly with changes in the frequency of the harmonic which it is to attenuate, such change occurring with the temperature changes of the exhaust gases.

The silencing element 16 is illustrated in FIGS. 6 and 7, and is formed from a pair of opposed sheet-metal stampings 49 and 50. Each of said stampings is provided with a centrally disposed concavity 51 constituting a first wall area bordered by a peripherally extending flange 52 constituting a second wall area. The flanges 52 on the pair of stampings 49 and 50 are rigidly secured together to form a seal around the border of the opposed concavities 51, whereby said concavities define a resonator volume 53. The concavity 51 in the stamping 49 abuts the inner face of the pipe 10 in a face-to-face relationship and is rigidly secured thereto for mounting the silencing element 16 within said pipe. The pipe 10 is provided with an outwardly projecting bead 54 which is closed along substantially its entire length by the underlying portion of the concavity 51 of the stamping 49 constituting a third wall area to define a resonator throat 56. Said throat is in open communication with the resonator volume 53 by an opening 57 formed in the wall of said stamping within the extent of the bead 54 and in open communication with the interior of the pipe 10 by the pipe bead 54 terminating beyond the extent of the stampings 49 and 50, as at 58. In this manner, the resonator volume 53 is disposed in open communication with the interior of the pipe 10 whereby said volume and throat 56 will attenuate the noise level of the sound waves carried in the gas stream moving through the pipe 10.

The silencing element 24 illustrated in FIGS. 8 and 9 is an inverted version of the silencing element 16 and is mounted externally of the pipe 10. As shown, the silencing element 24 comprises a pair of opposed sheet-metal stampings 60 and 62, each of which is provided with a centrally disposed concavity 63 constituting a first wall area bordered by a peripherally extending flange 64 constituting a second wall area. The flanges 64 on the stampings 60 and 62 are rigidly secured together and form a seal extending around the border of the opposed concavities 63 whereby said concavities define a resonator volume 65. The convacity 63 in the stamping 62 abuts the outer face of the pipe 10 in a face-to-face relationship and is rigidly secured thereto for mounting the silencing element on the pipe. An inwardly projecting bead 66 is formed in the pipe 10 within the extent of the portion of the concavity 63 abutting said pipe constituting a third wall area and forms therewith a resonator throat 67. Said throat is in open communication with the volume 65 by an opening 68 formed in the concavity 63 of the stamping 62 within the extent of the bead 66 and in open communication with the interior of the pipe 10 by an opening 69 formed in said bead. In this manner, the resonator throat 67 and resonator volume 65 are operatively interconnected to the gas stream moving through the pipe 10 to attenuate the noise level of the sound waves carried in said gas stream.

The silencing element 18 shown in FIGS. 10 and 11 constitutes a modified form of the resonator 14 shown in FIG. 2, and is adapted to attenuate both the low frequency sound waves and a wide band of high frequency sound waves. To this end, the resonator 18 comprises an imperforate sheet-metal stamping 70 and a perforate sheet-metal stamping 72, each of which is provided with a centrally disposed concavity 73 constituting a first wall area bordered by a peripherally extending flange 74 constituting a second wall area. As shown, the stampings 70 and 72 are disposed in opposed relationship, and interposed therebetween is an imperforate plate 75. The plate 75 is rigidly connected to the flanges 74 on the stampings 70 and 72 to act in combination with the concavity 73 in the stamping 70 to define a resonator volume 76 and to act in combination with the concavity 73 of the stamping 72 to form an enlarged cavity filled with a porous wadding of sound attenuating material 78, such as a fibrous mat of stainless steel, beryllium, molybdenum or tungsten, or a ceramic honeycomb of open ended cells, or the like. The concavity 73 in the stamping 70 abuts the pipe 10 in face-to-face relationship and rigidly secured thereto for mounting the silencing element in the pipe 10.

Formed with the portion of the stamping 70 abutting the pipe 10 is an inwardly projecting bead 79 constituting a third wall area which, with the portion of the pipe in alignment therewith, forms a resonator throat 80 for the volume 76. Said throat is in open communication with the gas stream as by one end of the bead terminating beyond the extent of the concavity 73 in the stamping 70, as at 81, and in open communication with the volume 76 by an opening 82 formed in said bead. In this manner, the resonator volume 76 is in open communication with the gas stream moving through the pipe 10 so that the resonator throat 80 and volume 76 will attenuate the noise level of the sound waves in the exhaust gases.

Because of their construction, the volume 76 and throat 80 attenuate a low range of frequencies, but the perforations in the stamping 72, which correspond to the throat 80, have a negligible length giving them an extremely high conductivity causing the cavity filled with the wadding to attenuate a high range of sound wave frequencies. These high frequency sound waves have large numbers of relatively closely spaced maximum pressure points. Therefore, the axial positioning of the element 18 along the conduit is less critical than the placement of the other silencing elements, and it may thus be desirable to tune the throat 80 and volume 76 to attenuate a frequency having a pressure point immediately adjacent the discharge end of the pipe 10, thereby leaving the other portions of the conduit free for mounting the silencing elements which only attenuate the lower sound wave frequencies at the maximum pressure points of those frequencies.

Still another embodiment of our silencing element construction is shown in FIGS. 12-14, and differs from the other embodiments in that it is formed from a unitary sheet-metal stamping. As shown, the stamping is provided with a pair of centrally disposed concavities 86 and 88 constituting first wall areas bordered by a peripherally extending flange 90. The stamping is bent along an imaginary line 91 extending between the concavities 86 and 88 to dispose said concavities in spaced opposed relation defining a resonator volume 92, and to dispose the flange stretches along the opposed sides of the stamping, constituting second wall areas, in abutting relation. Said flange stretches are rigidly secured together to form a seal extending around the border of the volume 92.

One of the concavities, 88 as shown, is contoured to abut the inner face of a gas-carrying conduit 94 in face-to-face relationship and is rigidly secured thereto for mounting the silencing element in said conduit. Formed within the portion of the concavity 88 abutting the conduit 94 is an inwardly projecting bead 95 constituting a third wall area which, with the portion of the conduit 94 extending thereover, forms a resonator throat 96. As shown in FIGS. 12 and 13, the bead is provided with an opening 97 adjacent one of its ends, and its opposite end terminates outside the extent of the concavity 88, as at 98, thereby operatively interconnecting the throat 96 to the volume 92 and the interior of the conduit 94, respectively. In this manner, the resonator throat 96 and volume 92 are in operative association with the gas stream moving through the conduit to attenuate the noise level of the sound waves in said gas stream.

As will be understood, the bead 95 may be formed in the conduit 94 to project outward therefrom instead of in the concavity 88 to provide a resonator structure similar to that shown in FIG. 6. Alternatively, said bead may be formed as an inwardly projecting bead in the conduit 94 and the concavity 88 contoured to abut the outer face of said conduit to provide a resonator structure similar to that shown in FIG. 8. As another alternative, the bead may be formed as shown in FIG. 13, but the concavity 88 contoured to mate with the outer face of the conduit 94 to provide a resonator structure similar to that shown in FIG. 4.

The fundamental resonant frequency of the exhaust conduit with which the frequency of the resonators are to be co-ordinated depends upon the speed of sound, and as shown by the first formula set forth above, the frequency of a resonator likewise depends upon the speed of sound. Since the speed of sound varies with temperature, a temperature gradient between the resonator throats and exhaust gases will interfere with the co-ordination necessary for the resonators to achieve their maximum attenuation. These changes in the speed of sound resulting from changes in temperature of the medium in which the sound waves are carried will also cause the frequencies of the sound waves to change, the degree of frequency change depending upon the temperatures and frequencies involved. In our exhaust conduit, the temperature of the exhaust gases in the engine to which the conduit is connected will vary over a wide temperature range of from about 200° F., when the engine is cold, to a temperature of about 1,700° F., when the engine is hot.

In a typical example of our invention using an exhaust conduit having a first overtone (second harmonic) of 80 cycles per second, we have found that that first overtone shifted to 106 cycles per second when the engine was propelling the vehicle 25 miles per hour, and that it was shifted to 121 cycles per second when the engine was propelling the vehicle 50 miles per hour. This frequency shifting resulted from the increased temperatures of the exhaust gases. Furthermore, at 25 miles per hour the engine had a firing frequency of about 80 cycles per second, and a firing frequency of 120 cycles per second at 50 miles per hour. As will be apparent, in the lower frequency range, i.e., below 200 cycles per second, the firing frequencies of the engine coincide with and augment the natural resonant frequencies of the exhaust conduit making these lower frequency ranges extremely difficult to attenuate.

As shown in FIG. 1, all of our silencing elements except the element 16 have throats which are located within the extent of gas-flow passage and thus directly thermally coupled to the gas stream; as by having a throat-forming wall common with the gas-flow passage (elements 22 and 24), or as by having the throat disposed within the extent of the normal arcuate configuration of the gas-carrying pipe (elements 14, 18 and the throat 96 in FIG. 12). This causes the throats to be subjected to the same temperature changes as the gas stream at the points where the throats are coupled to said gas stream, thereby resulting in the temperature gradient between the throats and gas stream being at a minimum and the resonators remaining co-ordinated with the resonant harmonic pipe frequencies which they are tuned to attenuate. Although the throat 56 of the element 16 projects outwardly beyond the normal curvature of the pipe 10, it too will remain relatively closely thermally coupled to gas stream. It does not project sufficiently outwardly to cause it to receive a high degree of air wash during vehicle movement, and it has a wall area common with the volume 53 which is located directly in the gas stream. Thus, all of our silencing elements, whether mounted internally or externally of the conduit, will remain co-ordinated, at least to a substantial degree, with the resonant harmonic pipe frequencies which they are tuned to attenuate.

Each of the silencing elements illustrated, except for the high frequency chamber shown in FIGS. 10 and 11, is provided with a relatively long resonator throat. It is to be understood, however, that the throats employed in our silencing elements may have any desired length depending upon the frequency which they are to attenuate. Thus, the throats may have relatively long lengths and/or large cross-sections for attenuating the low sound wave frequencies and relatively short lengths and/or small cross-sections for attenuating higher sound wave frequencies. It is also within the spirit and scope of our invention to employ more than a single throat in association with a single volume, if the use of a resonator having such a multiplicity of throats is deemed desirable.

While we have shown our silencing elements as mounted on or within a gas-carrying pipe having a circular cross-section, it is to be understood that said pipe may have any desired cross-sectional configuration. Indeed, in certain applications, it may be desirable for purposes of vertical clearance to flatten such gas-carrying pipe into a generally elliptical cross-section. In such instances, it is merely necessary to alter the configuration of the silencing elements so that they will mate with the walls of said pipe to form gas-tight seals around the peripheries of the resonator volumes and throats.

For purposes of simplicity of description, we have only described our invention for use in an exhaust system for an engine. However, it may, of course, also be used on the intake side of an internal combustion engine for transporting and silencing the gas intake flow to the engine, or for many other silencing applications.

We claim as our invention:

1. In a sound attenuating conduit for conveying, and attenuating the noise level of, a moving gas stream, a pipe forming a gas-flow passage, at least one silencing element secured to the wall of said pipe and comprising first wall areas disposed in opposed spaced relation forming a resonator volume, said first wall areas having a portion thereof abutting the wall of said pipe in face-to-face contact and rigidly secured thereto for mounting the silencing element thereon, abutting second wall areas bordering said first wall areas and extending along the periphery of said volume to close the same, and a third wall area within the extent of said portion of said first wall areas and disposed in spaced relation to the aligned portion of the pipe wall to form therewith a resonator throat in open communication with said volume and gas-flow passage, whereby said silencing element will attenuate the noise level of the gas stream moving through said gas-flow passage.

2. The invention as set forth in claim 1 in which said silencing element is formed from a unitary sheet-metal stamping having an outwardly projecting concavity formed therein inwardly from the coplanar marginal edges thereof, and an inwardly projecting bead formed within the extent of said concavity, said stamping being bendable upon itself with the margins thereof rigidly secured together and forming said second wall areas, said concavity and the opposed portion of the stamping forming said first wall areas, and said bead forming said third wall area, said bead having an open end outside the extent of said concavity and an opening within the extent of said concavity.

3. The invention as set forth in claim 1 in which said pipe wall is provided with a bead projecting out of the plane thereof, and said silencing element is mounted on said pipe in alignment with said bead, said silencing element being formed from a unitary sheetmetal stamping having a concavity formed therein inwardly from the coplanar marginal edges thereof, said stamping being bendable upon itself with the margins thereof rigidly secured together and forming said second wall areas, said concavity and the opposed portion of the stamping forming said first wall areas, and the portion of the stamping in alignment with said bead forming said third wall area, said bead having one of its ends extending beyond the extent of the stamping and said portion of the stamping having an opening formed therein.

4. In a sound attenuating conduit for conveying, and attenuating the noise level of, a moving gas stream, a pipe forming a gas-flow passage, at least one silencing element secured to the wall of said pipe and formed from a pair of sheet-metal members, comprising first wall areas on said members spaced inward from the peripheral edges thereof and disposed in spaced relationship to form a resonator volume, said first wall areas having a portion thereof abutting the wall of said pipe in face-to-face contact and rigidly secured thereto for mounting the silencing element thereon, rigidly interconnected second wall areas on said members bordering said first wall areas and extending along the periphery of said volume to close the same, and a third wall on one of said members within the extent of said portion of said first wall area and disposed in spaced relation to the aligned portion of the pipe wall to form therewith a resonator throat in open communication with said volume and gas-flow passage, whereby said silencing element will attenuate the noise level of the gas stream moving through said gas-flow passage.

5. The invention as set forth in claim 4 in which said first wall areas comprise a concavity formed in at least one of said pair of members and the portion of the other of said pair of members in alignment therewith, said second wall areas comprise the margins of said pair of members, and said third wall area comprises a bead formed in one of said members and projecting into the volume formed by said first wall members, said bead being disposed in open operative communication with said gas-flow passage and said volume.

6. The invention as set forth in claim 5 in which said silencing element is mounted on the inner face of the pipe wall and said bead has an opening formed therein and has one of its ends open outside the extent of said first wall area to dispose it in said open operative communication with said volume and gas-flow passage respectively.

7. The invention as set forth in claim 6 with the addition that a perforated sheet-metal shell having a concavity formed therein is secured to said other of said pair of members, the space between said concavity and said other of said pair of members being filled with a wadding of porous sound absorbing material.

8. The invention as set forth in claim 5 in which said silencing element is mounted on the outer face of the pipe wall and said bead and the portion of the pipe in alignment therewith have openings formed therein to dispose said bead in said open communication with said volume and gas-flow passage.

9. The invention as set forth in claim 4 in which said pipe has a bead formed therein within the general extent of said silencing element, said first wall areas comprise a concavity formed in at least one of said pair of members and the portion of the other of said pair of members in alignment therewith, said second wall areas comprise the margins of said pair of members, and said third wall area comprises that portion of the silencing element in alignment with said bead, said bead and the portion of the silencing element in alignment therewith being in open communication with said gas-flow passage and said volume.

10. The invention as set forth in claim 9 in which said silencing element is mounted on the inner face of the pipe wall and said bead projects outwardly, one end of said bead terminating outside the extent of said silencing element and said portion of the silencing element in alignment with said bead having an opening formed therein.

11. The invention as set forth in claim 9 in which said silencing element is mounted on the outer face of the pipe wall and said bead projects inwardly, said bead and said portion of the silencing element in alignment therewith having openings formed therein.

12. An exhaust silencing system for an internal combustion engine, comprising a pipe for connection to the engine to receive the exhaust gases thereof and to convey such gases to a discharge point, and a plurality of axially spaced silencing elements secured to the wall of said pipe, each of said silencing elements comprising first wall areas disposed in opposed spaced relation forming a resonator volume, said first wall areas having a portion thereof abutting the wall of said pipe in face-to-face contact and rigidly secured thereto for mounting the silencing element thereon, abutting second wall areas bordering said first wall areas and extending along the periphery of said volume to close the same, and a third wall area within the extent of said portion of said first wall areas and disposed in spaced relation to the aligned portion of the pipe wall to form therewith a resonator throat in open communication with the pipe interior and resonator volume to operatively interconnect said volume and the gas stream moving through said pipe for attenuating the noise level thereof, said resonator throats and volumes having pluralities of predetermined sizes to tune them to attenuate wide bands of sound wave frequencies.

13. An exhaust silencing system for an internal combustion engine, comprising a pipe for connection to the engine to receive the exhaust gases thereof and to convey such gases to a discharge point, said pipe forming a gas conduit wherein the exhaust gas sound produces one or more distinct sound pressure points at particular locations along the conduit, and at least one silencing element disposed adjacent at least one of said points, said element comprising first wall areas disposed in opposed spaced relation forming a resonator volume, said first wall areas having a portion thereof abutting the wall of said pipe in face-to-face contact and rigidly secured thereto for mounting the silencing element thereon, abutting second wall areas bordering said first wall areas and extending along the periphery of said volume to close the same, and a third wall area within the extent of said portion of said first wall areas and disposed in spaced relation to the aligned portion of the pipe wall to form therewith a resonator throat in open communication with said volume and with said gas conduit adjacent the pressure point of the frequency to which it and its associated volume are tuned, whereby said element will preferentially attenuate the noise level of said frequency.

14. An exhaust silencing system for an internal combustion engine, comprising a pipe for connection to the engine to receive the exhaust gases thereof and to convey such gases to a discharge point, said pipe forming a gas conduit wherein the exhaust gas sound produces a plurality of sound-pressure points at particular locations along the conduit, and pluralities of silencing elements mounted internally and externally on said pipe, each of said elements comprising first wall areas disposed in opposed spaced relation forming a resonator volume, said first wall areas having a portion thereof abutting the wall of said pipe in face-to-face contact and rigidly secured thereto for mounting the silencing element thereon, abutting second wall areas bordering said first wall areas and extending along the periphery of said volume to close the same, and a third wall area within the extent of said portion of said first wall areas and disposed in spaced relation to the aligned portion of the pipe wall to form therewith a resonator throat in open communication with said volume and with said gas conduit adjacent the pressure point of the frequency to which it and its associated volume are tuned, whereby said element will preferentially attenuate the noise level of said frequency.

15. The invention as set forth in claim 14 in which at least one pair of said internally and externally mounted silencing elements are mounted on said pipe in positions to dispose their throats in open communication with the gas conduit at substantially the same sound-pressure point, whereby both of said pair of elements will attenuate the sound wave frequency producing said pressure point.

References Cited in the file of this patent

UNITED STATES PATENTS

| | | |
|---|---|---|
| Re. 21,324 | MacKenzie et al. | Jan. 16, 1940 |
| 2,051,515 | Bourne | Aug. 18, 1936 |
| 2,099,858 | MacKenzie et al. | Nov. 23, 1937 |
| 2,099,887 | Heath | Nov. 23, 1937 |
| 2,297,046 | Bourne | Sept. 29, 1942 |
| 2,357,792 | Powers | Sept. 5, 1944 |
| 2,694,462 | Robbins et al. | Nov. 16, 1954 |
| 3,031,026 | Price | Apr. 24, 1962 |

FOREIGN PATENTS

| | | |
|---|---|---|
| 52,032 | France | Mar. 15, 1943 |